Patented Jan. 3, 1950

2,493,373

UNITED STATES PATENT OFFICE 2,493,373

DIMERS OF ANGELICA LACTONE

Hans Wolff and Wendell W. Moyer, Decatur, Ill., assignors to A. E. Staley Manufacturing Company, Decatur, Ill., a corporation of Delaware No Drawing. Application July 31, 1946, Serial No. 687,527

5 Claims. (Cl. 260—344)

This invention relates to dimers of angelica lactone. More specifically, it pertains to dimers of angelica lactone that contain two lactone rings and one double bond conjugated with a carbonyl group.

Provision of the novel dimers herein disclosed and methods for their preparation are principal objects of the invention.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

We have discovered that angelica lactone, in either of its two known forms, or as a mixture of the forms, can be transformed with the aid of a suitable catalyst into two substances having the same elementary composition and saponification equivalent as angelica lactone but having twice its molecular weight. These substances, exhibiting the properties of dilactones, can be conveniently separated from unreacted angelica lactone and higher polymeric material in the reaction mixture by vacuum distillation. The dilactones thus obtained can be separated from one another by fractional crystallization from suitable solvents or by conversion into mixed derivatives followed by separation of these from one another and regeneration of the original dimers therefrom.

In accordance with the principles of the present invention, angelica lactone can be dimerized by bringing it into contact under substantially anhydrous conditions with a selected catalyst having alkaline or potentially alkaline characteristics. Choice of reaction temperature and contact time for optimum results depend in part upon the nature and proportion of the catalyst used.

Among the catalysts suitable for promoting dimerization of angelica lactone are the tertiary amines, the alkali metal alkoxides, the hydroxides of the alkali metals, and the free alkali metals. The tertiary amines are especially adapted for dimerization of angelica lactone. They are in general miscible therewith, thus obviating any need for stirring the reaction mixture to maintain uniform contact between catalyst and the lactone, and they can be so chosen with regard to boiling point that they can be easily recovered from the reaction products by vacuum distillation. Furthermore, they catalyze the dimerization of either form of angelica lactone or a mixture of the forms.

The preferred tertiary amine catalysts are the lower tertiary alkyl amines such as, for example, triethylamine or tributyl amine. These are preferred because of their availability, relatively moderate costs, and ease of separation from the reaction mixture. Very weak tertiary amines such as pyridine, for example, are less effective as dimerization catalysts.

The proportion of catalyst required for significant rate of dimerization is small, from 0.5 to 5.0 per cent of the weight of angelica lactone usually being sufficient. Traces of the catalysts, however, will exert a discernible effect upon the reaction. As larger proportions are used, the dimerization rate is increased, so that the upper limit of catalyst proportion is fixed more by economic than by chemical considerations.

The beta form of angelica lactone ($\gamma$-methyl $\Delta^{\alpha\beta}$ crotonlactone) is the preferred starting material for dimerization. Any of the foregoing mentioned catalysts actively promote its dimerization at suitably selected temperatures. The alpha form ($\gamma$-methyl $\Delta^{\beta,\gamma}$ crotonlactone) is less reactive than the beta form with respect to dimerization by the alkali metals and the alkali alkoxides. This form can, however, be dimerized in good yield by prolonged heating with a tertiary alkylamine such as, for example, triethylamine.

Temperatures employed in the dimerization can be varied widely. They may range, for example, from 20 to 200° C., depending upon the kind of catalyst used and the desired reaction. Active catalysts such as sodium methoxide promote dimerization at an appreciable rate at room temperature, and provide high yields of the dimers in 30 to 40 minutes at a reaction temperature of about 80° C. When a less active catalyst is used, such as 3 per cent of tributyl amine for example, the reaction mixture should be heated at a much higher temperature, preferably about 160° C., for several hours before maximum yield of the dimers is obtained. Temperatures above about 200° C. are not recommended because they tend to increase the formation of polymeric materials and other products at the expense of the dimers.

Reaction time required to provide a substantial yield of dimers depends upon the reaction temperature and the kind of catalyst used. As indicated above, 1 per cent of sodium methoxide provides a good yield of dimers in about one-half hour at a temperature of about 80° C. On the other hand, angelica lactone should be heated for about 70 to 80 hours at 80° C. with 3 per cent of triethylamine to obtain a similar yield of the dimers. The minimum time in which a good yield of dimers can be obtained with tertiary amine catalysts, even at elevated temperatures, is about 5 hours.

In using a catalyst that is insoluble or slowly soluble in angelica lactone, it is recommended that the catalyst be present in a finely divided state and that the reaction mixture be stirred.

When the catalyst used is soluble in angelica lactone, stirring of the reaction mixture is unnecessary, except to provide uniform distribution of heat.

In general, the catalysts that we use promote the formation of two dimers of angelica lactone in proportions that vary with the nature of the catalyst. Both dimers, when purified, are white crystalline solids. Their melting points are about 83 to 84° C. and 87 to 88° C. The higher melting dimer is considerably less soluble in ethanol than the lower melting one, and the two may be separated from one another by recrystallization from this solvent. The solubilities of the higher and lower melting forms in ethanol at 25° C. are about 3.9 grams and 5.4 grams, respectively, per 100 ml. of saturated solution.

The two condensed angelica lactone products that we have prepared have elementary compositions and approximate molecular weights indicating a molecular formula of $C_{10}H_{12}O_4$. In addition, they possess the following common properties:

1. Saponification equivalent of about 98.
2. Contain only one double bond, which bond is conjugated with a carbonyl group.
3. Can be smoothly hydrogenated under moderate hydrogen pressure with Raney nickel or platinum oxide catalysts to yield saturated dilactones of molecular formula $C_{10}H_{14}O_4$, distilling at about 190° C. at a receiver pressure of about 2 mm. of mercury and having saponification equivalents of about 99.
4. When the hydrogenated dilactones are saponified with excess alkali and the remaining alkali in the saponification solutions is neutralized at 0° C. with hydrochloric acid, the neutralized solutions slowly liberate alkali, faster on warming, until a maximum of one-half of the alkali consumed during saponification is liberated.
5. Acidification of the final alkaline solutions obtained in (4), or acidification of the original alkaline solutions of the saponified hydrogenated dimers, followed by warming, regenerates the original hydrogenated dilactones.
6. When the dimers are saponified with excess alkali and the remaining alkali in the saponification solutions is neutralized at 0° C. with hydrochloric acid, the neutralized solutions slowly liberate alkali, faster on warming, until a maximum of one-half of the alkali consumed during saponification is liberated.
7. Acidification of the final alkaline solutions obtained in (6), or acidification of the original alkaline solution of the saponified dimers, yields stable saturated crystalline lactone acids instead of the original dilactones. The lactone acids thus obtained have neutralization equivalents of 214, saponification equivalents of 107, and elementary compositions and approximate molecular weights indicating a common molecular formula of $C_{10}H_{14}O_5$.

The purified lactone acid melts at 123 to 124° C. and 155 to 156° C., respectively. The higher melting lactone acid is considerably less soluble in water than the lower melting product.

The invention is further illustrated by the following examples which disclose in more detail methods for the preparation of the angelica lactone dimers and their characterizing derivatives. Unless otherwise specified, all parts listed in the examples are by weight.

*Example 1.—Sodium methoxide catalyst*

One hundred parts of beta angelica lactone were mixed with 2 parts of dry finely powdered sodium methoxide in a vessel equipped with a mechanical stirrer. While being stirred, the mixture was heated to about 80° C. and held at that temperature for about 30 minutes, during which time the catalyst slowly dissolved. The reaction solution was then cooled to about room temperature, neutralized with cold dilute aqueous hydrochloric acid, and separated from the aqueous phase. The separated water layer was extracted with chloroform, and the chloroform extract was combined with the organic liquid separated from the neutralized reaction mixture. The combined extract and main reaction product were then distilled through a short fractionating column, first under the reduced pressure of a water aspirator to remove chloroform, and then at a receiver pressure of about 3 mm. of mercury. The bulk of the reaction solution distilled over the temperature range of 215 to 230° C. About 61 parts of this fraction was obtained.

The fraction distilling at 215 to 230° C. at 3 mm. was diluted with about an equal volume of dry methanol and allowed to stand overnight in a refrigerator at about 5° C. to induce crystallization. The crop of crystals thus obtained was separated from mother liquor, washed with a small volume of cold methanol, and dried. The colorless crystalline product melted at 83 to 84° C., after recrystallization from ethanol or benzene, and its yield amounted to 38 parts or 62 per cent of the collected fraction.

The saponification equivalent of the product melting at 83 to 84° C. was found to be about 98, and warm acidification of its saponification solution yielded a saturated lactone acid which, after purification by recrystallization from water, had a melting point of about 123 to 124° C., a neutralization equivalent of about 214, and a saponification equivalent of about 107. Cryoscopic determination of the molecular weight of the product melting at 83 to 84° C., using camphor, gave a value of 232, and analyses for carbon and hydrogen showed that the compound contained 6.36 per cent hydrogen and 61.3 per cent carbon (calculated for dimeric angelica lactone: mol. wt. 196, carbon 61.2 per cent, hydrogen 6.12 per cent.) This elementary composition and approximate molecular weight indicates a molecular formula of $C_{10}H_{12}O_4$.

Determinations of saponification equivalent, molecular weight, and elementary composition made of the liquid residue remaining after separating the crop of crystalline material from the fraction distilling at 215 to 230° C. at 3 mm. gave substantially the same values as those found for the crystalline product. Acidification of the saponified liquid residue yielded a less soluble lactone acid which, after recrystallization from water, had a neutralization equivalent of about 214, a saponification equivalent of about 107, and a melting point of 155 to 156° C. The determined elementary compositions and approximate molecular weights of both lactone acids indicate that their common molecular formula is $C_{10}H_{14}O_5$.

Substitution of other alkali alkoxides for sodium methoxide in this example, such as sodium ethoxide, sodium butoxide, or the corresponding alcoholates of potassium and lithium, yields similar results. Use of alpha angelica lactone with alkali alkoxides under the conditions of this example provided lower yields of the dilactones, but otherwise the results were similar to those obtained with the beta form.

Example 2.—Sodium metal catalyst

One hundred parts of beta angelica lactone were stirred for 5 hours at about 80° C. with about 1 per cent of finely divided metallic sodium, and the reaction solution was then worked up for dimeric lactones as described under Example 1. There was thus obtained 64 parts of a liquid product boiling at 215 to 225° C. at a receiver pressure of about 3 mm. of mercury. From this, also as described under Example 1, there was isolated 41 parts of pure crystalline dimer melting at 87 to 88° C. The solid dimer and the liquid residue had identical saponification equivalents.

Dimerization of alpha angelica lactone with sodium metal under the conditions of this example gave about 40 per cent of mixed dimers.

Other alkali metals, such as potassium and lithium, may be successfully used in place of sodium for dimerizing angelica lactone according to this example.

Example 3.—Triethylamine catalyst

A solution of 1 part of triethylamine in 100 parts of beta angelica lactone was heated for 42 hours at about 90° C. and then distilled through a short fractionating column at reduced pressure. There was collected 54 parts of a fraction boiling at 215 to 230° C. at a receiver pressure of about 3 mm. of mercury. Pure crystalline dimer melting at 83° to 84° C. was isolated from this fraction according to the procedure described in Example 1 resulting in a yield of 28 parts or 53 per cent of the total fraction. The properties of the crystalline product and liquid residue thus obtained were the same as those described in Example 1.

Other tertiary amines may be satisfactorily substituted for triethylamine in this example. Thus, about 50 parts of mixed dimers was recovered from a solution of 3 parts of tributyl amine in 100 parts of beta angelica lactone that was heated for 5 hours at 160° C.

Substitution of alpha angelica lactone for the beta form in this example yields substantially the same result.

Example 4.—Potassium hydroxide catalyst

A mixture of 100 parts of beta angelica lactone and 2 parts of powdered potassium hydroxide was stirred and heated in a closed flask on a steam bath for about 4 hours at a temperature of 80 to 85° C. The cooled reaction mixture was neutralized with aqueous acid and worked up for dilactones as described in Example 1. There was thus obtained 35 parts of liquid product distilling at 211° to 215° C. at a receiver pressure of about 3 mm. of mercury. The saponification equivalent of this fraction was 100, indicating that it consisted mostly of dimeric angelica lactones. Dilution of this fraction with methanol, followed by chilling, and described under Example 1, yielded a crop of crystals from which was obtained by recrystallization 5 parts of pure dimer melting at 83° to 84° C.

The dimers of angelica lactone described above are potentially useful as plasticizers for films and coatings derived from either proteins or carbohydrates, and as intermediates in the preparation of medicinal compounds. They are also useful as sources of their lactone acids from which may be prepared extended series of potentially useful esters, amides, nitriles, and other derivatives.

The expression "angelica lactone," as used hereinbefore and in the appended claims, is intended to include alpha angelica lactone, beta angelica lactone, and mixtures of these two forms.

The expressions "dimer of angelica lactone" and "dimers of angelica lactone" which appear in the foregoing description and in the appended claims, signify polymerization products of angelica lactone having the same elementary composition as angelica lactone and twice its molecular weight.

All temperatures recited herein were measured with an ordinary quality of laboratory mercury thermometer. Distillation pressures were measured with a simple closed end U-tube mercury manometer attached to the vessel receiving the condensed distillate. Owing to the high vapor velocities occurring during low pressure distillation and the consequent pressure drop in the direction of vapor flow, the receiver pressure is always somewhat less than the true distillation pressure, i. e., the vapor pressure over the surface of the boiling liquid.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. The process of preparing angelica lactone dimers which comprises heating angelica lactone monomer in the presence of an alkaline catalyst selected from the group consisting of the alkali metals, alkoxides of the alkali metals, alkali metal hydroxides, and tertiary amines.
2. The process of preparing angelica lactone dimers which comprises heating angelica lactone monomer at a temperature lying within the range of 20° to 200° C. with a tertiary alkyl amine catalyst for at least 5 hours.
3. Angelica lactone dimer.
4. Angelica lactone dimer having a melting point within the range of 83–84° C.
5. Angelica lactone dimer having a melting point within the range of 87–88° C.

HANS WOLFF.
WENDELL W. MOYER.

REFERENCES CITED

The following references are of record in the file of this patent:

UNITED STATES PATENTS

| Number | Name | Date |
| --- | --- | --- |
| 2,163,109 | Spanagel | June 20, 1939 |
| 2,361,036 | Kung | Oct. 24, 1944 |

OTHER REFERENCES

Marvel et al.: J. A. C. S., vol. 61, July 1939, pages 1682–1684.

Beilstein: Vol. XVII, pages 252 and 253. Collected papers of W. H. Carothers on High Polymers, Interscience Publ. Inc. (1940), pages 106–111.